United States Patent
Tu et al.

(10) Patent No.: US 7,916,478 B2
(45) Date of Patent: Mar. 29, 2011

(54) ELECTRONIC DEVICE

(75) Inventors: I-Chuan Tu, Tainan (TW); Chiu-An Huang, Yun-Lin County (TW)

(73) Assignee: Qisda Corporation, Taoyuan County (TW)

( * ) Notice: Subject to any disclaimer, the term of this patent is extended or adjusted under 35 U.S.C. 154(b) by 196 days.

(21) Appl. No.: 12/416,615

(22) Filed: Apr. 1, 2009

(65) Prior Publication Data

US 2009/0314915 A1    Dec. 24, 2009

(30) Foreign Application Priority Data

Jun. 20, 2008    (TW) ................................ 97123194 A

(51) Int. Cl.
*G06F 1/16*    (2006.01)
(52) U.S. Cl. .................................... 361/679.59; 248/398
(58) Field of Classification Search ............ 361/679.01, 361/679.59; 248/398; 307/116
See application file for complete search history.

(56) References Cited

U.S. PATENT DOCUMENTS

| | | | | |
|---|---|---|---|---|
| 4,951,241 A * | 8/1990 | Hosoi et al. | ............... | 361/679.09 |
| 5,235,495 A * | 8/1993 | Blair et al. | ............... | 361/679.26 |
| 5,375,076 A * | 12/1994 | Goodrich et al. | ........ | 361/679.17 |
| 6,016,248 A * | 1/2000 | Anzai et al. | ............... | 361/679.59 |
| 6,874,744 B2 * | 4/2005 | Rawlings et al. | ........ | 248/292.14 |
| 7,206,198 B2 * | 4/2007 | Wang | ........................ | 361/679.55 |
| 7,232,098 B2 * | 6/2007 | Rawlings et al. | ............ | 248/121 |
| 7,660,113 B2 * | 2/2010 | Kaneko | ..................... | 361/679.59 |
| 7,762,519 B2 * | 7/2010 | Kunii et al. | .................... | 248/688 |
| 2006/0050471 A1 * | 3/2006 | Chen | ............................. | 361/681 |

* cited by examiner

*Primary Examiner* — Lisa Lea-Edmonds

(57) ABSTRACT

The invention discloses an electronic device comprising a casing and a stand. The stand is detachably disposed on the casing for supporting the electronic device on a plane and rotatably disposed at a first position or a second position with respect to the casing. The casing has a first engaging portion located on a first side thereof. The stand comprises a second engaging portion pivotally connected to the first engaging portion along a first direction. An incline extending along a second direction different from the first direction is disposed on the casing. Once the electronic device is hit by a force and the stand is at the second position, the stand will slide along the incline and then the second engaging portion will depart from the first engaging portion, so as to make the stand depart from the casing.

11 Claims, 11 Drawing Sheets

ELECTRONIC DEVICE

BACKGROUND OF THE INVENTION

1. Field of the Invention

The present invention generally relates to an electronic device, and more particularly, the stand of the electronic device is hard to be broken when the electronic device is hit by an external force.

2. Description of the Prior Art

At present, electronic devices play the roles of indispensable application tools, such as mobile TV, notebook, digital camera (DC), voice over internet protocol (VoIP) phone, etc., in general life.

In order to put the electronic devices on a plane (such as a tabletop) to make it easier for a user to watch the monitor of the electronic device without holding it, most of the manufacturers or designers of the electronic device provide a support stand for the electronic device. When the user wants to make the electronic device to stand on the plane, he or she only needs to extend the stand from the casing of the electronic device, and then makes the stand support the electronic device.

However, in prior arts, the stand is connected to the casing of the electronic device by a latch or a hinge, and the stand can not be easily detached from the electronic device. When the electronic device is supported by the stand, and the electronic device is hit by an external force along a direction perpendicular to the plane, the stand can be easily broken by the external force. In addition, because the stand needs an extra latch, hinge or other elements to connect with the casing of the electronic device, the cost and labor to produce the electronic device is therefore increased.

Accordingly, the main aspect of the present invention is to provide an electronic device with a stand which is hard to be broken by an external force to solve the problems of the prior arts.

SUMMARY OF THE INVENTION

Accordingly, an aspect of the present invention is to provide an electronic device. When the electronic device is hit by a force and the stand is opened correspondingly to the electronic device, the stand can be easily detached from the casing with no damage.

According to an embodiment of the invention, the electronic device comprises a casing and a stand. The stand is detachably disposed on the casing for supporting the electronic device on the plane and rotatably disposed at a first position or a second position with respect to the casing. The casing has a first engaging portion located on a first side thereof, and the stand comprises a second engaging portion pivotally connected to the first engaging portion along a first direction.

In the embodiment, an incline is located on the casing and extends along a second direction which is different from the first direction. When the electronic device is hit by a force at the second direction and the stand is disposed at the second position, the stand slides along the incline, and then the second engaging portion departs from the first engaging portion, so as to make the stand depart easily from the casing.

Therefore, with the electronic device of the invention, the stand has the second engaging portion pivotally connected to the first engaging portion in the casing, there is no need for extra latches or hinges, and the present invention can efficiently decrease the cost and assembly labor in producing the electronic device. Besides, when the electronic device is placed on the plane with the open stand and hit by a force from a direction perpendicular to the plane, the stand slides along the incline and naturally departs from the electronic device with no damage.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
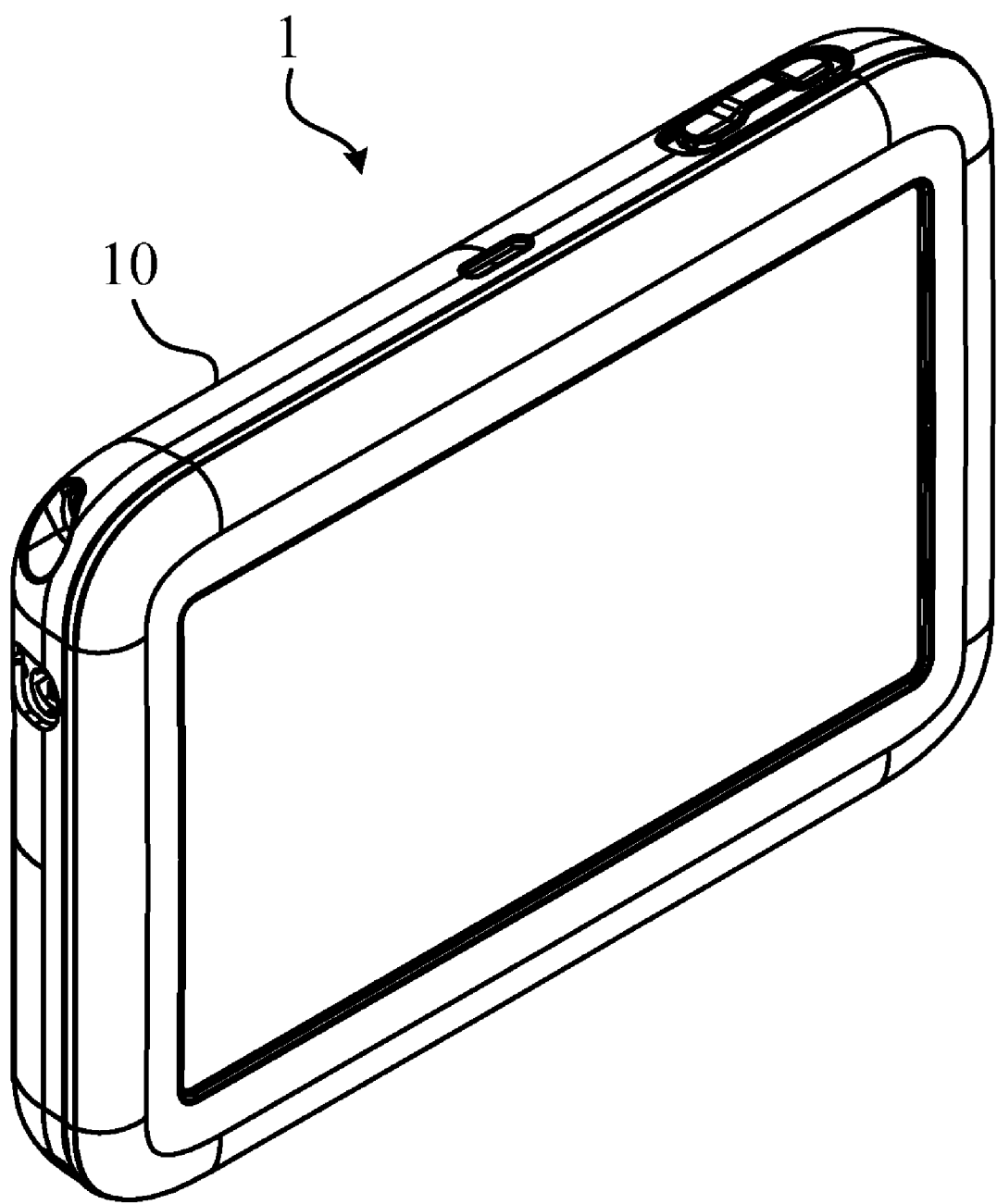
FIG. 1 is an exterior view illustrating the electronic device of an embodiment of the invention.
Figure 2:
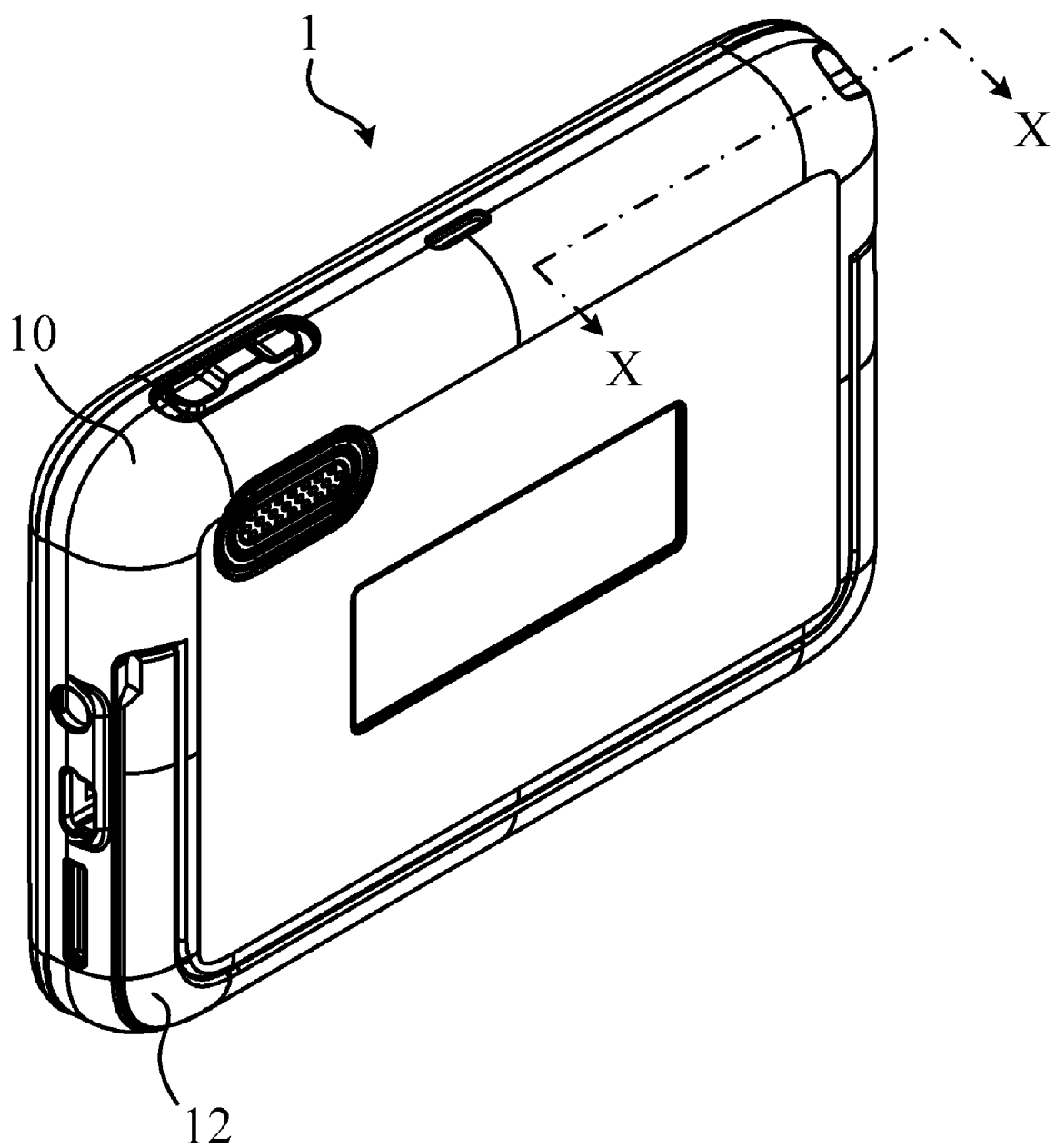
FIG. 2 is another view illustrating the electronic device in FIG. 1.
Figure 3:
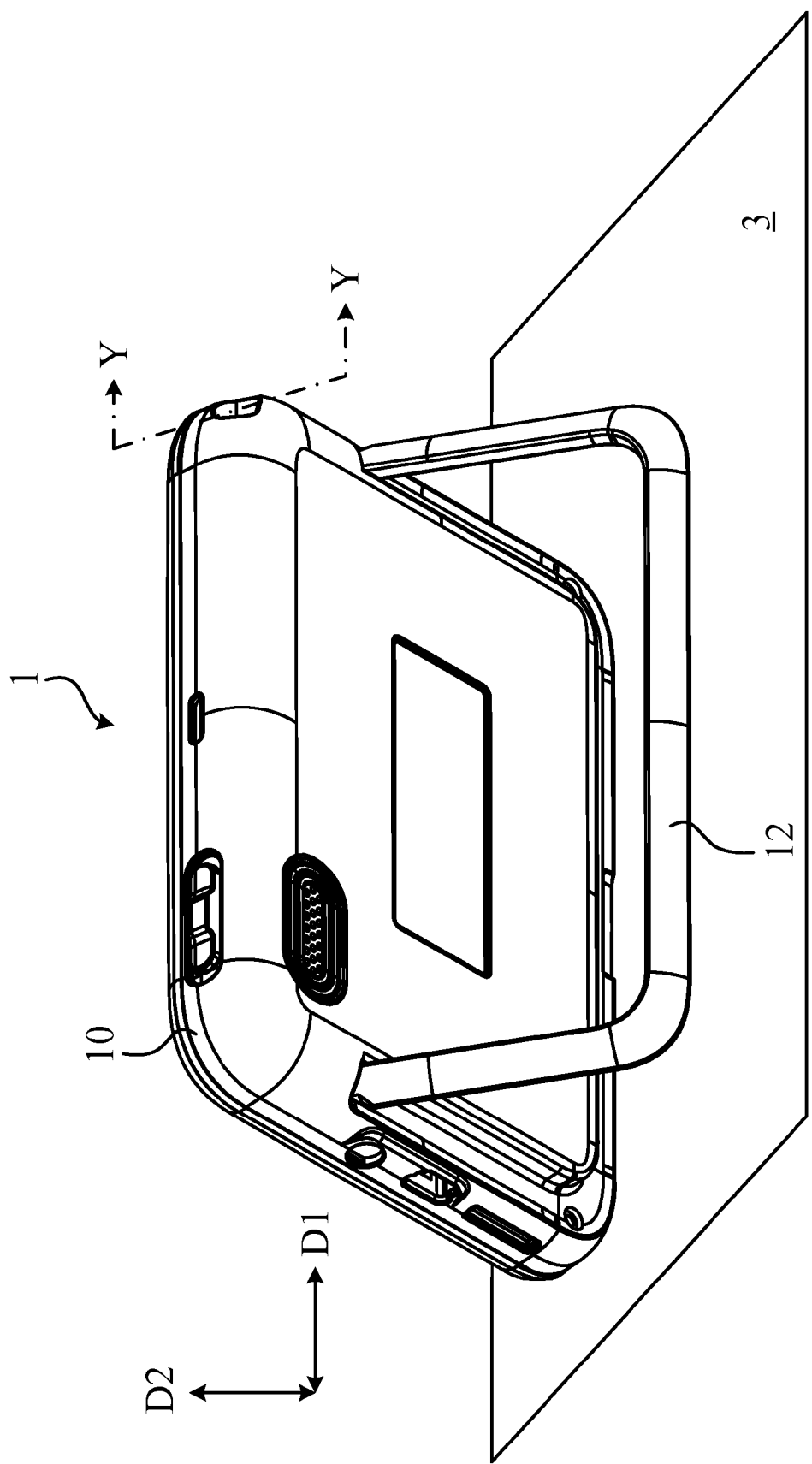
FIG. 3 is a view illustrating the stand in FIG. 2 opened corresponding to the casing.

Please refer to FIG. 1 to FIG. 3. FIG. 1 is an exterior view illustrating the electronic device 1 of an embodiment of the invention. FIG. 2 is another view illustrating the electronic device 1 in FIG. 1. FIG. 3 is a view illustrating the stand 12 in FIG. 2 opened corresponding to the casing 10. The electronic device 1 may be any product that needs a stand such as a mobile TV, a personal digital assistant (PDA), a mobile phone, a voice over internet protocol (VoIP) phone, etc. The embodiment in this invention is a mobile TV, but not limited to it.

It should be understood that the electronic device 1 is equipped with soft and hard elements essential to the operation, such as central processing unit (CPU), random access memory (RAM), read only memory (ROM), display panel, backlight module, battery for the power supply, operating system, etc. These elements are well-known to people having ordinary skill in the art. The description related to such functions thus will not be explained herein.

As shown in FIG. 1 to FIG. 3, the electronic device 1 comprises a casing 10 and a stand 12. The stand 12 is detachably and pivotally connected to the casing 10, and rotatably disposed at a first position or a second position with respect to the casing 10. In the embodiment, as shown in FIG. 2, the stand 12 is closed correspondingly to the casing 10 at the first position. As shown in FIG. 3, the stand 12 is opened correspondingly to the casing 10 at the second position and supports the electronic device 1 on a plane 3.

Figure 4:
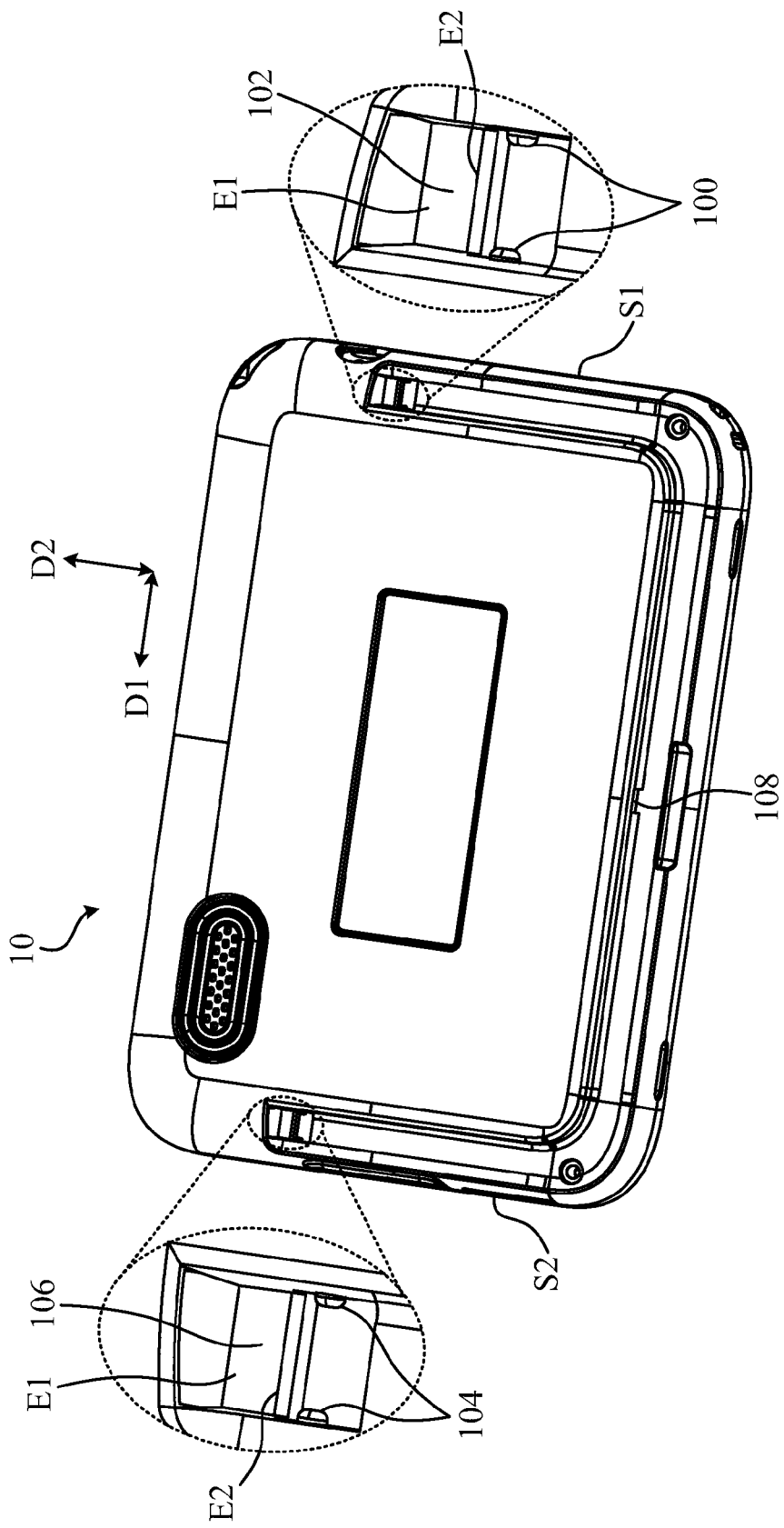
FIG. 4 is an exterior view illustrating the casing in FIG. 3.

Please refer to FIG. 4. FIG. 4 is an exterior view illustrating the casing 10 in FIG. 3. As shown in FIG. 4, a first side S1 and a second side S2 are defined on the casing 10, and a first direction D1 and a second direction D2 different from the first direction D1 are defined also. In the embodiment, the second direction D2 is perpendicular to the first direction D1 which is horizontal and parallel to the plane 3 in FIG. 3.

The casing 10 preferably includes two first engaging portions 100 bulged along the first direction D1 from the first side S1. An incline 102 is disposed on the casing 10, and extends along the second direction D2. Specifically, the incline 102 includes a first end E1 and a second end E2 bulgier than the first end E1 along the first direction D1. In other words, the incline 102 inclines gradually by the first end E1 toward the second end E2. In addition, the casing 10 preferably has two third engaging portions 104 along the first direction D1 bulged on the second side S2. Likewise, another incline 106 extends along the second direction D2 is disposed on the second side S2 of the casing 10.

In practice, the design of the casing 10 has the following variable combinations: (1) a first engaging portion 100 and a incline 102, (2) two first engaging portions 100 and a incline 102, (3) a first engaging portion 100, a third engaging portion 104 and inclines 102, 106, and (4) two first engaging portions 100, two third engaging portion 104 and inclines 102, 106.

Figure 5:
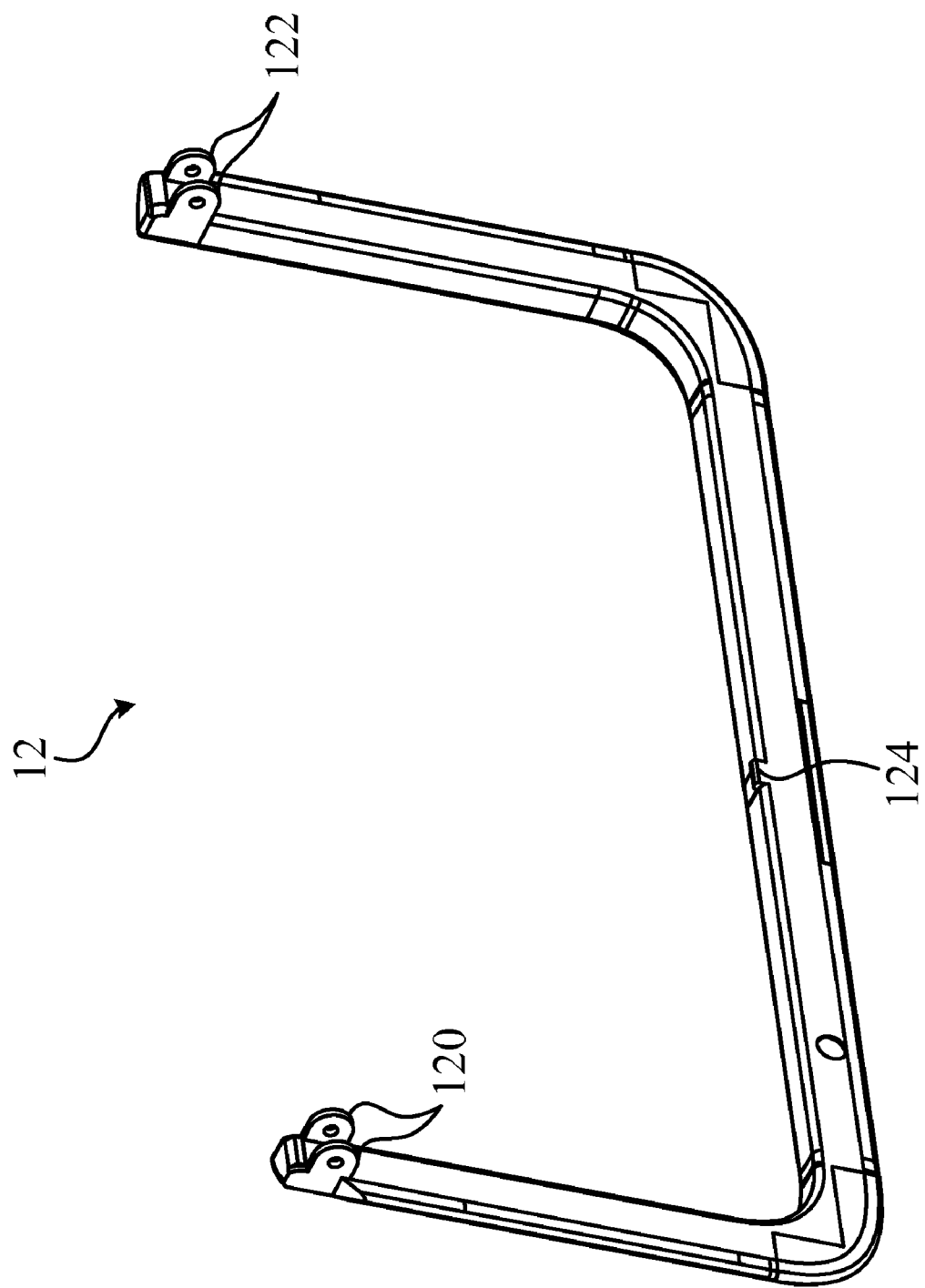
FIG. 5 is an exterior view illustrating the stand in FIG. 3.

Please refer to FIG. 5. FIG. 5 is an exterior view illustrating the stand 12 in FIG. 3. The stand 12 preferably includes two second engaging portions 120. The second engaging portions 120 are pivotally connected to the first engaging portions 100 of the casing 10 along the first direction D1. Beside, the stand 12 preferably includes two fourth engaging portions 122 connected to the third engaging portions 104 of the casing 10 along the first direction D1.

Coordinated with the casing 10, the stand 12 is also designed with the following variable combinations: (i) a second engaging portion 120, (ii) two second engaging portions 120, (iii) a second engaging portion 120 and a fourth engaging portion 122, and (iv) two second engaging portions 120 and two fourth engaging portions 122. In principle, the stand 12 is pivotally connected to the casing 10 more stably by the casing 10 in (4) and the stand 12 in (iv).

In the embodiment, the first engaging portion 100 and the third engaging portion 104 are designed as a first and a second protruding point respectively, and the second engaging portion 120 and the fourth engaging portion 122 are designed as a first and a second sheet with a first and a second aperture respectively. In another embodiment, the first engaging portion 100 and the third engaging portion 104 are designed with a hole, and the second engaging portion 120 and the fourth engaging portion 122 are designed with a sheet having a protruding point. Since the third and the fourth engaging portions 104 and 122 are approximately identical to the first and the second engaging portions 100 and 120, the operation between the first engaging portion 100 and the second engaging portion 120 is further explained thereinafter.

Figure 6:
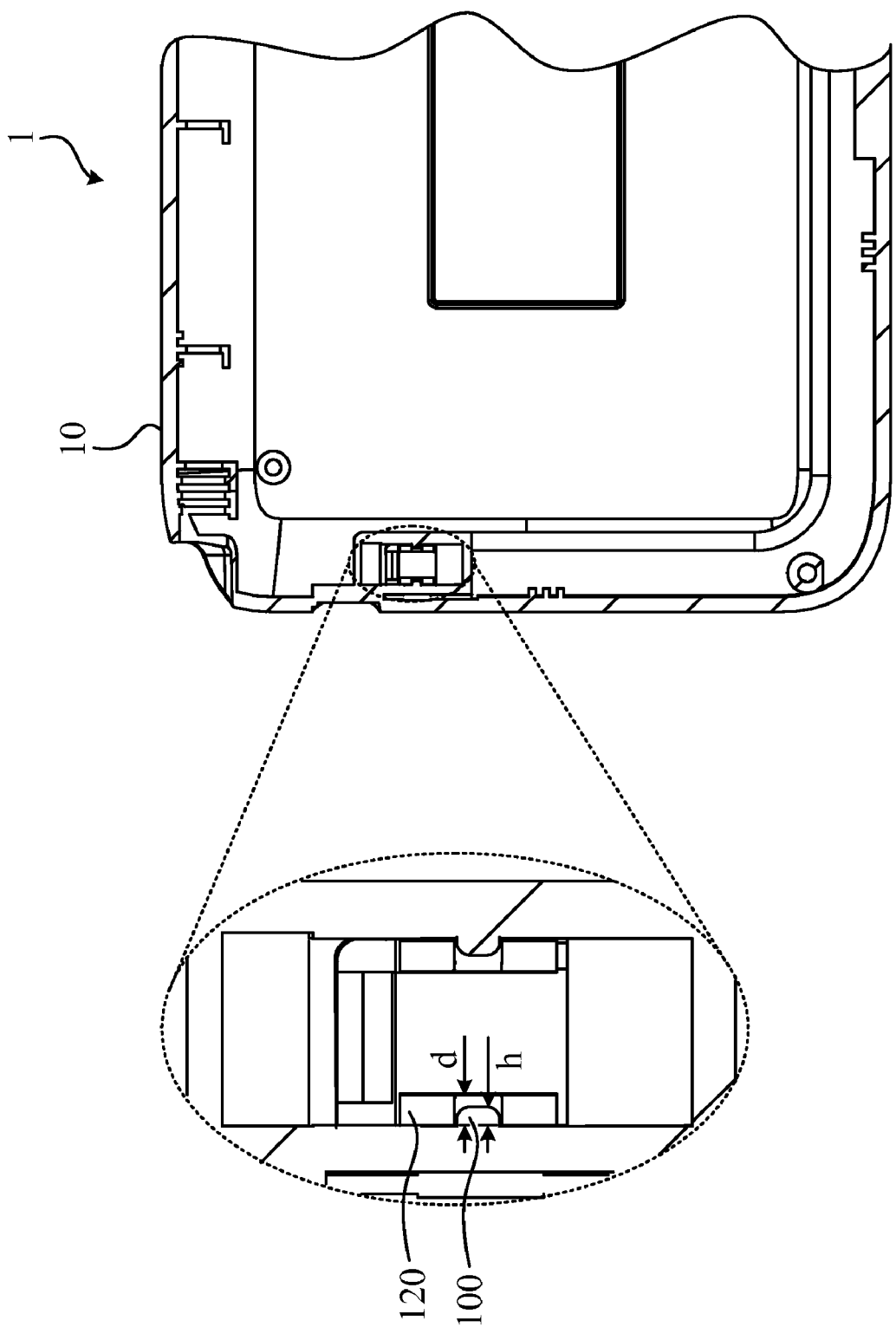
FIG. 6 is a sectional view illustrating the electronic device along line X-X in FIG. 2.

Please refer to FIG. 6. FIG. 6 is a sectional view illustrating the electronic device 1 along line X-X in FIG. 2. As shown in FIG. 6, the depth d of the first aperture of the first sheet (the second engaging portion 120) is larger than the height h of the protruding point (the first engaging portion 100). The height h of the protruding point is preferably designed as larger than half and smaller than the depth d of the first aperture of the first sheet.

In the embodiment, the first engaging portion 100 is a protruding point with an arc surface. When a user presses the stand 12 toward the casing 10, the first sheet of the second engaging portion 120 will deform slightly along the arc surface of the first engaging portion 100 till the first protruding point (the first engaging portion 100) interposes the first aperture of the first sheet (the second engaging portion 120). Thus, the stand 12 can easily be assembled in and disassembled from the casing 10 reversely.

Figure 7:
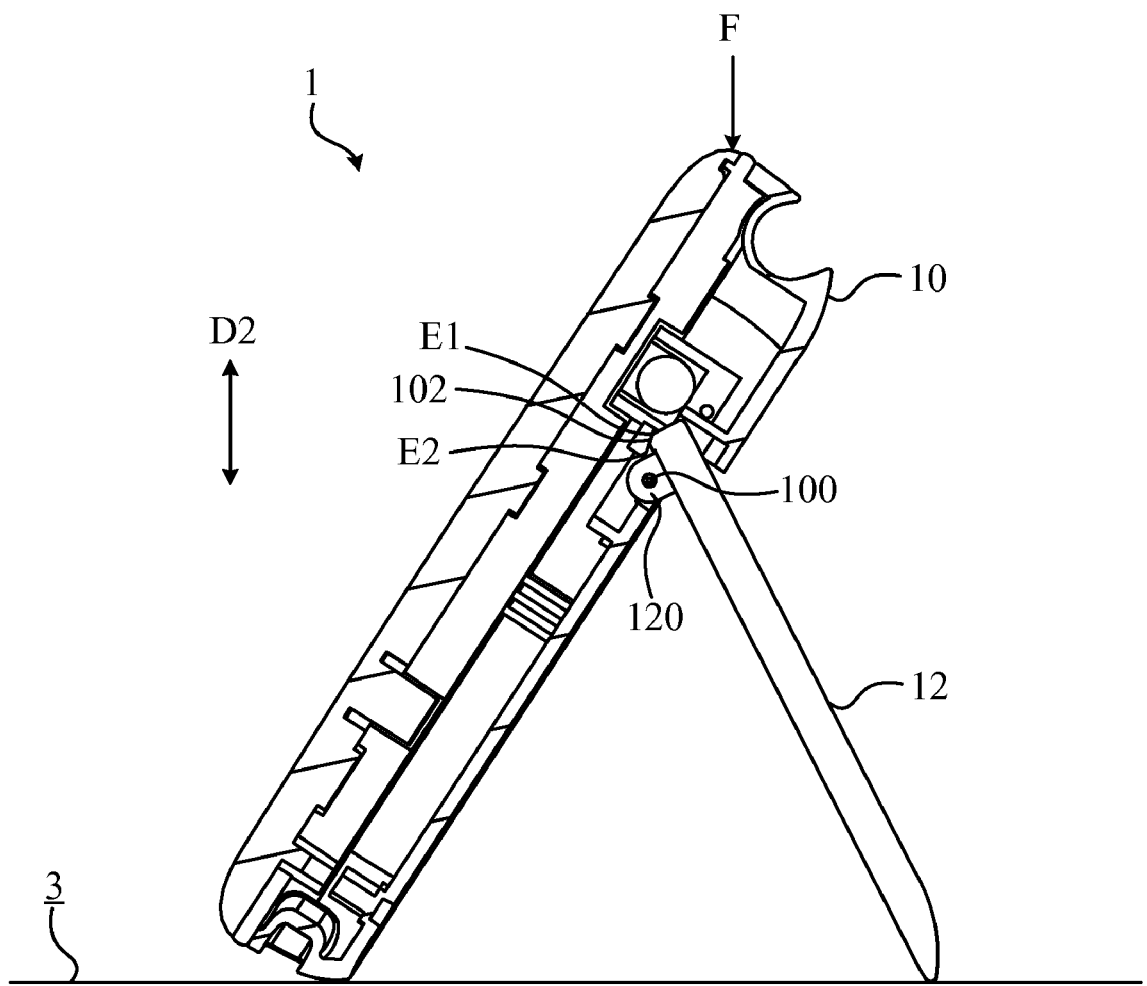
FIG. 7 is a sectional view illustrating the electronic device along line Y-Y in FIG. 3.
Figure 8:
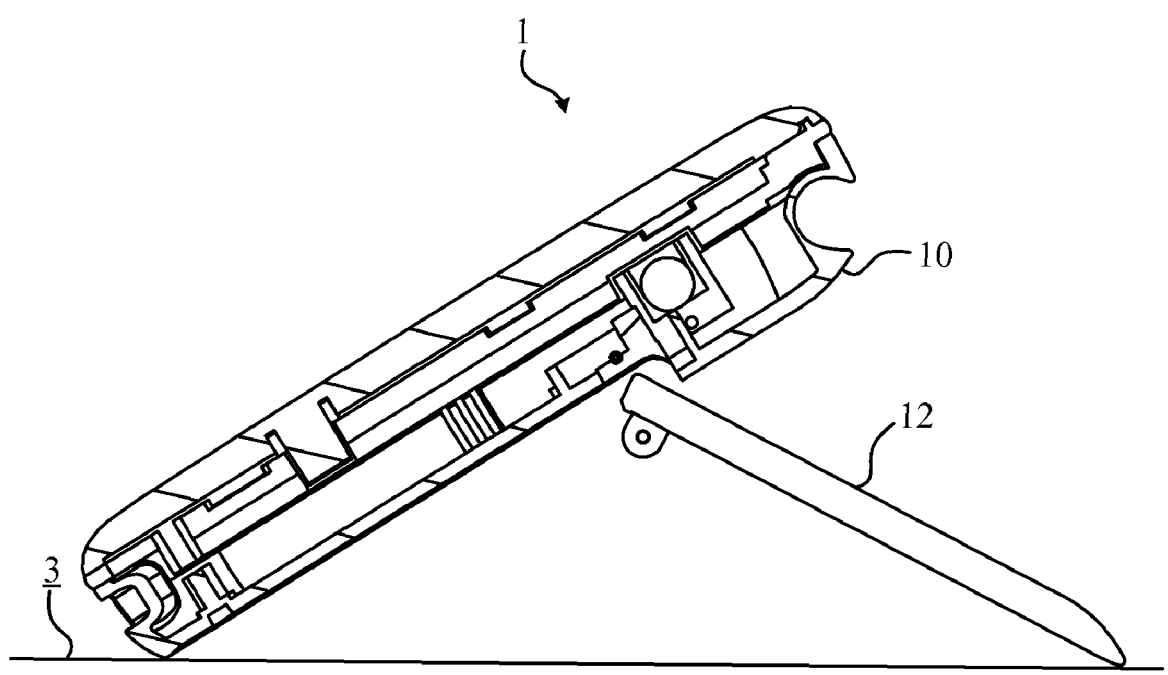
FIG. 8 is a view illustrating the stand detached from the casing in FIG. 7.

Please refer to FIG. 7 and FIG. 8. FIG. 7 is a sectional view illustrating the electronic device 1 along line Y-Y in FIG. 3. FIG. 8 is a view illustrating the stand 12 detached from the casing 10 in FIG. 7. As shown in FIG. 7, when the stand 12 is disposed at the second position (namely, when the stand is opened relative to the casing), the stand 12 stably supports the electronic device 1 on the plane 3 and the top of the stand 12 is against the first end E1 of the incline 102. When the electronic device 1 is hit by a force F along the second direction D2, the top of the stand 12 slides along the incline 120, and the first sheet deforms slightly at the first direction D1 and along the arc surface of the first engaging portion 100. Till the first aperture of the first sheet (the second engaging portion 120) disengages from the first protruding point 100, the stand 12 detaches from the casing 10 as shown in FIG. 8.

Please refer to FIG. 2, FIG. 4 and FIG. 5 again. In the embodiment, the casing 10 includes a recess 108, and the stand 12 includes a latch 124. When the stand 12 is disposed at the first position (namely, the stand is closed relative to the casing 10), the latch 124 is engaged with the recess 108.

Figure 9:
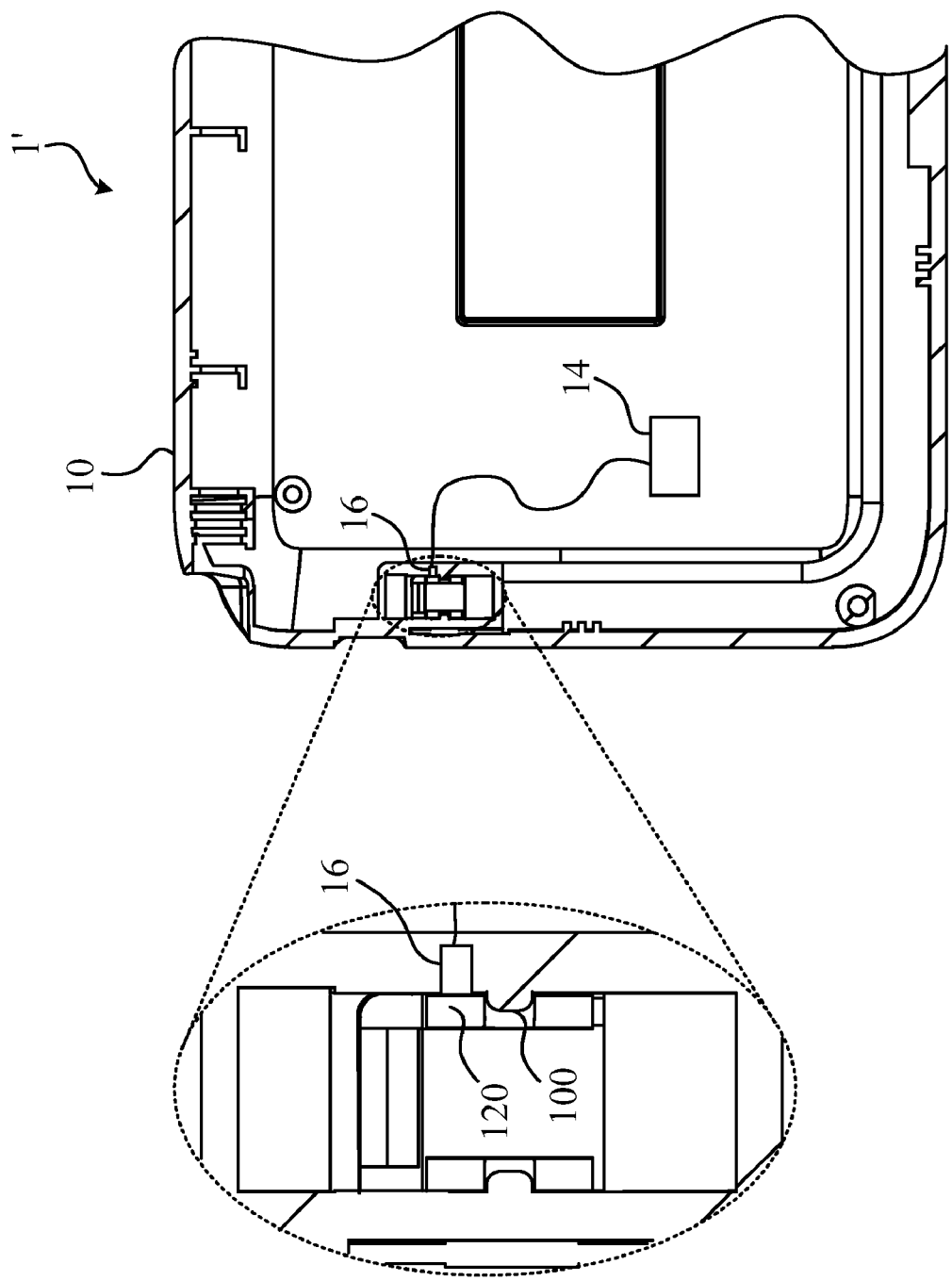
FIG. 9 is a partial sectional view illustrating the electronic device of another embodiment of the invention.

Please refer to FIG. 9. FIG. 9 is a partial sectional view illustrating the electronic device 1' of another embodiment of the invention. Except the processor 14 and the sensor 16, the remaining elements in the electronic device 1' are identical to those of the electronic device 1. The description related to such functions thus will not be stated herein.

As shown in FIG. 9, the sensor 16, electrically connected to the processor 14, is disposed on the casing 10 and adjacent to the first engaging portion 100. As long as the stand 12 is pivotally connected to the casing 10, even during rotation with respect to the casing 10, the second engaging portion 120 of the stand 12 leans against the sensor 16. When the electronic device 1' is turned on and hit by a force, which results in the separation of the stand 12 and the casing 10, the sensor 16 will send out a signal to the processor 14, and the processor 14 will shut down to protect the electronic device 1' according to the signal.

Figure 10:
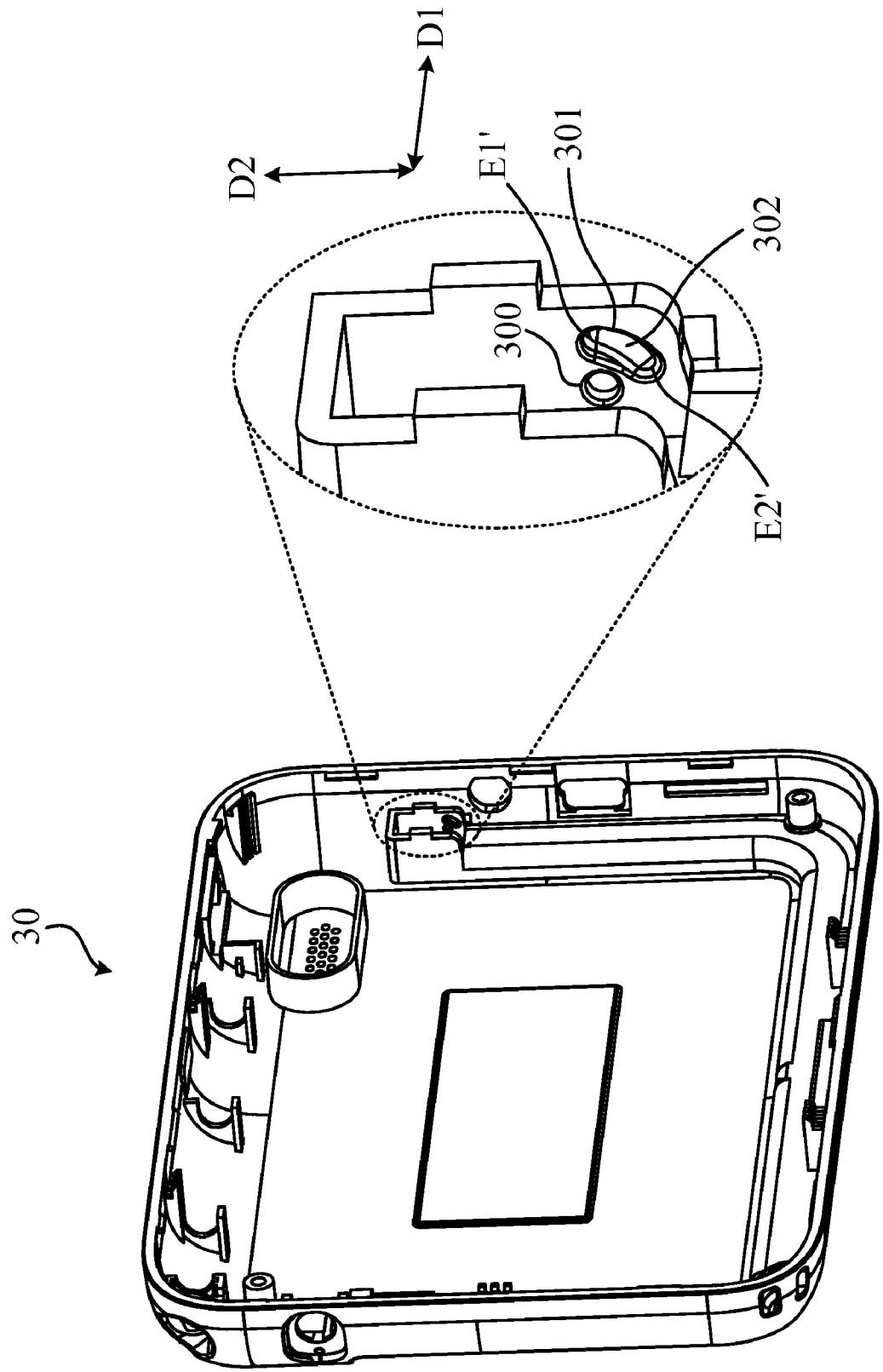
FIG. 10 is an inside view illustrating the casing of another embodiment of the invention.

Please refer to FIG. 10. FIG. 10 is an inside view illustrating the casing 30 of another embodiment of the invention. Different with the casing 10 in FIG. 4, the first engaging portion 300 of the casing 30 is designed as a hole and the incline 302 is located in a track 301. As shown in FIG. 10, the incline 302, including a first end E1' and a second end E2', extends along the second direction D2. The second end E2' is bulgier than the first end E1' at the first direction D1. In other words, the incline 302 gradually inclines from the first end E1' toward the second end E2'.

Figure 11:
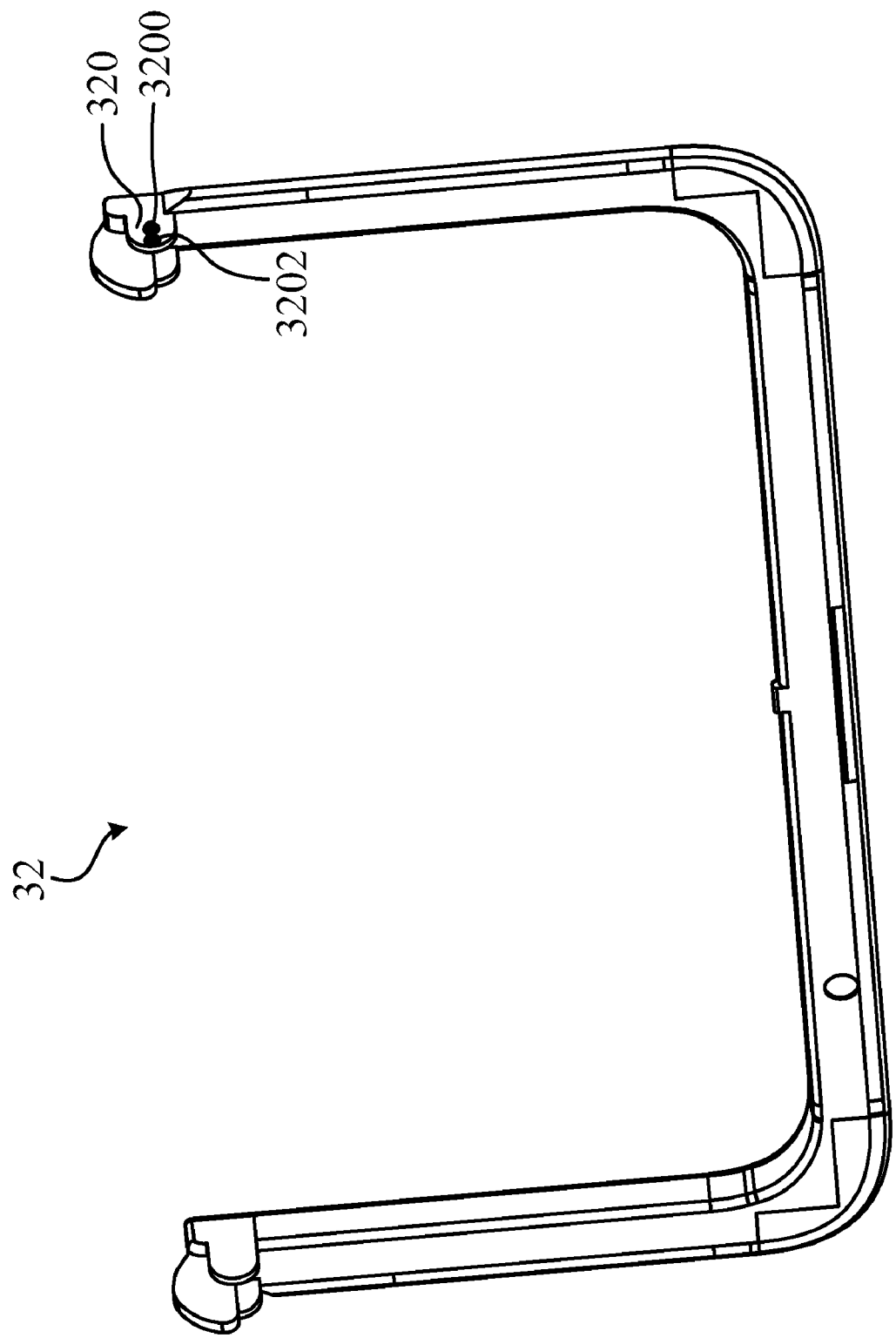
FIG. 11 is an exterior view illustrating the stand of another embodiment of the invention.

Please refer to FIG. 11. FIG. 11 is an exterior view illustrating the stand 32 of another embodiment of the invention. The stand 32 is designed to match the casing 30 in FIG. 10. Different with the stand 12 in FIG. 5, the second engaging portion 320 of the stand 32 is a sheet having a protruding point. As shown in FIG. 11, the second engaging portion 320 has two protruding points 3200 and 3202. The stand 32 is pivotally connected to the first engaging portion 300 (hole) of the casing 30 by the protruding point 3200, and the protruding point 3202 leans against the incline 302 in the track 301. The protruding point 3202 is preferably designed higher than the protruding point 3200, and the protruding point 3200 slightly engaged to the first engaging portion 300 (hole), i.e. the height of the protruding point 3200 is smaller than the depth of the first engaging portion 300. Other mechanisms of the stand 32 and the casing 30 are approximately the same with those of the stand 12 and the casing 10, thus, the description related to such functions will not be stated herein.

It should be understood that the first engaging portion 300 (hole) may be formed at the first end E1' of the incline 302 on the casing 30, and the protruding point 3200 of the stand 32 may be omitted accordingly. In addition, the track 301 and the incline 302 may be designed on the stand 32. The design varies with different application and should not be confined to FIG. 10 and FIG. 11.

To sum up, the second engaging portion of the stand is detachably and pivotally connected to the first engaging portion of the casing in the electronic device of the invention. In contrast to the prior art, there is no need for extra latches or hinges, and the present invention can efficiently decrease the cost and assembly labor in producing the electronic device. In addition, when the electronic device is placed on the plane by the opened stand and hit by a force from a direction perpendicular to the plane, the stand slides along the incline and departs easily from the electronic device with no damage.

Although the present invention has been illustrated and described with reference to the preferred embodiment thereof, it should be understood that it is in no way limited to the details of such embodiment but is capable of numerous modifications within the scope of the appended claims.

What is claimed is:

1. An electronic device comprising:
    a casing with a first engaging portion located on a first side of the casing;
    a stand detachably disposed on the casing for supporting the electronic device on a plane, the stand being rotatably disposed at a first position or a second position with respect to the casing and having a second engaging portion pivotally connected to the first engaging portion along a first direction; and
    an incline located on the casing and extending along a second direction different from the first direction;
    wherein when the electronic device is hit by a force at the second direction and the stand is disposed at the second position, the stand slides along the incline, the second engaging portion departs from the first engaging portion, and the stand departs from the casing.

2. The electronic device of claim 1, wherein the first direction is parallel to the plane.

3. The electronic device of claim 1, wherein the second direction is perpendicular to the first direction.

4. The electronic device of claim 1, wherein the incline has a first end and a second end, and the second end is bulgier than the first end at the first direction.

5. The electronic device of claim 4, wherein the first engaging portion is disposed at the first end of the incline.

6. The electronic device of claim 4, wherein when the stand is disposed at on the second portion, the stand is against the first end of the incline.

7. The electronic device of claim 1, wherein the first engaging portion is a first protruding point, and the second engaging portion is a first sheet with a first aperture whose depth is larger than the height of the first protruding point.

8. The electronic device of claim 7, further comprising:
    a third engaging portion disposed on a second side of the casing; and
    a fourth engaging portion disposed on the stand and for pivotally connecting to the third engaging portion at the first direction.

9. The electronic device of claim 8, wherein the third engaging portion is a second protruding point, and the fourth engaging portion is a second sheet with a second aperture whose depth is larger than the height of the second protruding point.

10. The electronic device of claim 1, wherein the casing comprises a recess, and the stand comprises a latch, when the stand is disposed at the first position, the latch engages with the recess.

11. The electronic device of claim 1, further comprising:
    a processor; and
    a sensor electrically connected to the processor and pushed against by the stand, the sensor being disposed on the casing and adjacent to the first engaging portion;
    wherein when the stand is detached from the sensor, the sensor sends out a signal to the processor, and the processor shuts down the electronic device.

* * * * *